United States Patent [19]

Rumpp et al.

[11] 4,044,845
[45] Aug. 30, 1977

[54] DRILLING TOOL WITH A TWO PART INPUT UNIT

[75] Inventors: Gerhard Rumpp, Inning; Wilm Krüger, Puchheim; Dieter Scholz, Unterpfaffenhofen, all of Germany

[73] Assignee: Hilti Aktiengesellschaft, Schaan, Liechtenstein

[21] Appl. No.: 662,234

[22] Filed: Feb. 27, 1976

[30] Foreign Application Priority Data

Mar. 3, 1975 Germany ............................ 2509141

[51] Int. Cl.² ............................................. E21C 13/00
[52] U.S. Cl. .................................. 175/409; 175/320; 173/DIG. 2
[58] Field of Search ................ 178/DIG. 2, 75, 131, 178/130, 139, 104; 175/17, 15, 409, 320, 325, 408; 64/27 NM

[56] References Cited

U.S. PATENT DOCUMENTS

| | | | |
|---|---|---|---|
| 1,657,387 | 1/1928 | Goldschmidt | 173/131 X |
| 1,869,892 | 8/1932 | Grove et al. | 175/320 |
| 2,076,039 | 4/1937 | Miller | 175/325 X |
| 2,260,070 | 10/1941 | Wilhilde | 173/139 X |
| 3,637,033 | 1/1972 | Mayall | 175/320 |
| 3,848,931 | 11/1974 | Swisher | 173/DIG. 2 |
| 3,866,692 | 2/1975 | Stelljes | 173/139 |

FOREIGN PATENT DOCUMENTS 1,191,771  4/1965  Germany ............................ 175/325

*Primary Examiner*—Ernest R. Purser
*Assistant Examiner*—Richard E. Favreau
*Attorney, Agent, or Firm*—Toren, McGeady and Stanger

[57] ABSTRACT

A drilling tool for use in boring holes is formed of an axially elongated drilling member and a holder or input unit. The input unit laterally encloses the rearward end of the drilling member and is formed of at least two materials, one having a higher thermal conductivity than the other. The higher thermal conductivity material is in contact with the shank of the drilling member and extends radially outwardly to the outer surface of the input unit. The higher thermal conductivity material can have various shapes, for instance, that of a coil, spaced disks, a sleeve with inwardly extending webs or an inner sleeve and an outer sleeve spaced apart and joined by a flange-like web. The second material may be a plastic and can be fixed into holes or openings formed in the first material.

20 Claims, 5 Drawing Figures

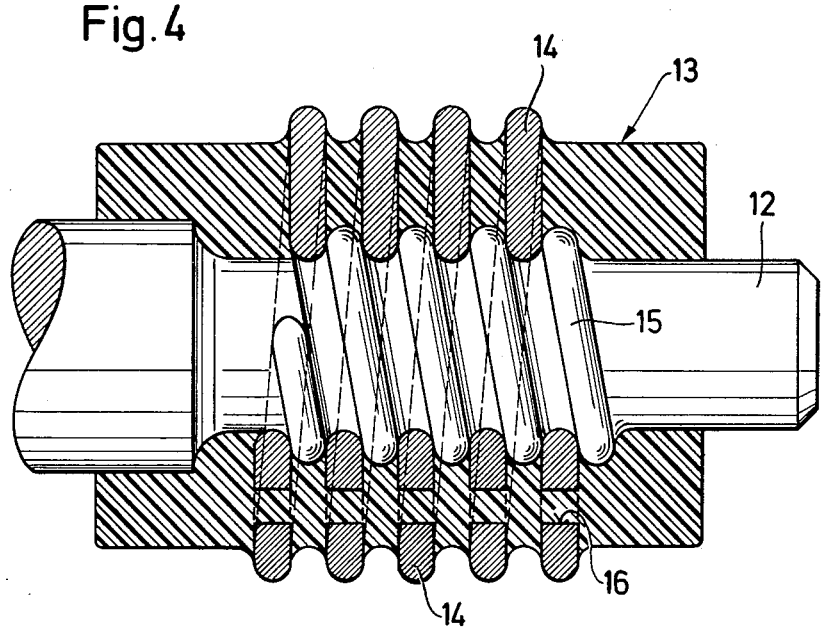
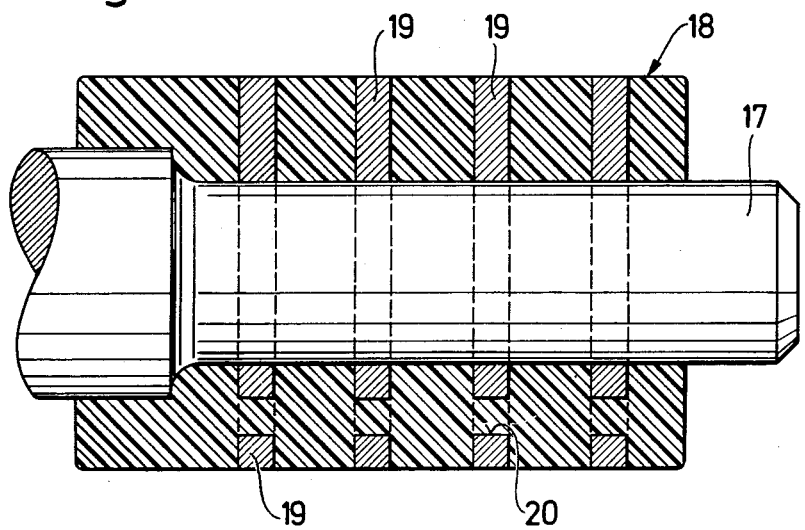

DRILLING TOOL WITH A TWO PART INPUT UNIT

SUMMARY OF THE INVENTION

The present invention is directed to a drilling tool formed of a drilling member including an axially extending shank and sleeve-type holder or input unit fitted on the rearward end of the shank. The outer surface of the input unit consists, at least in part, of a material having a higher thermal conductivity than the remaining material forming the input part.

In known drilling tools the part which effects the drilling and the holder or input part are usually formed integrally of the same material. While the input part has substantially constant dimensions arranged to be fitted into the tool holder of a drilling machine, the part which does the drilling can have different dimensions depending on the type and size of hole to be drilled. In particular, when a small diameter drilling member is used, there are considerable differences between the diameters of the drilling part and the input part which must be balanced. In order to balance these differences in dimension it has been known to upset the diameter of the starting material corresponding to the drilling part to such an extent that the desired holder or input part can be formed or the starting material can be reworked by removing material or by deformation to provide the desired differences in diameter of the two parts. Furthermore, it has also been known to use a starting material having a mean diameter between that of the two parts and to rework it to the desired diametrical dimensions by a combinatinon of the above methods.

In view of the large amount of material to be reworked, these known methods have been relatively expensive. Where there is a great difference in dimension between the two parts, joining them together by soldering or welding does not eliminate all the disadvantages, especially since the considerable weight of such drilling tools has an adverse effect on the drilling operation.

In an attempt to eliminate these various disadvantages it has been known to form the drilling part and the input part of such tools of two different parts and join them to one another, that is, to provide the drilling part or member with a sleeve-type input prt formed of a different and less expensive material. In particular, it was found that materials which are softer than the material of the drilling part are especially suitable for the input part, since a drilling tool with such an input part has a favorable effect on the drilling machine in which it is used due to its damping properties. These known tools, preferably used in drill hammers, are designed so that the shank of the drilling member passes completely through the input part in the axial direction so that the blows produced in the drilling machine or hammer, which act in the axial direction, are directed against the shank while the rotary movement is transmitted to the shank over the softer holder or input part. Accordingly, the input part must be connected to the shank of the drilling member so that the torque can be adequately transmitted. This requirement can be met in a relatively easy manner, for example, by forming the input part of plastic.

However, it has been found that the poor thermal conductivity of such material used in forming the input part is of considerable disadvantage in these otherwise economical drilling tools. As is well known, considerable heat is generated in the drilling operation by friction between the drilling tool and the material in which a hole is being formed. Furthermore, the drilling member or tool is also considerably heated at its rearward end by the blows directed against it when it is used in the drill hammer. This heat, which could be eliminated in integral drilling tools by means of the tool holder in the drill hammer, cannot be eliminated in a drilling tool where the input part is formed of material having a lower thermal conductivity than that of the drilling member. As a result, the heat accumulates in the shank of the drilling member with the development of undesired deformation. For example, when a plastic input part is used it is not possible to maintain a satisfactory transmission of torque from the input part to the drilling member shank nor to center the shank in the input part. Furthermore, the accumulated heat causes an expansion of the input part so that undesired friction is produced between that part and the holder of the drilling hammer. The play necessary between the input part and the holder which is necessary for satisfactory operation, can no longer be ensured. Accordingly, the present invention is directed to the problem of providing a drilling tool which is economical to produce and which presents no problems as far as the elimination of heat is concerned.

Therefore, in accordance with the present invention, the shank of the drilling member is connected with the radially outer surface of the input part or unit over one or more heat conducting bridges formed of a material having a thermal conductivity which is higher than that of the material forming the remainder of the input part.

Such heat conducting bridges, which can be embedded in the material of the input unit, effect a sufficient elimination of the heat generated in the shank of the drilling member by passing the heat to the outer surface of the input part and then to the holder or chuck of the drilling machine. This construction requires that at least a part of the outer surface of the input unit is made of a material having a higher thermal conductivity than the remaining material of the input unit. It is possible to sheath the lower thermal conductivity material of the input unit with such a higher thermal conductivity material or to form a portion of the outer surface of the unit with such a higher thermal conductivity material. Further, the heat conducting bridges extending radially outwardly from the shank of the drilling member can also form at least a portion of the outer surface of the input unit.

The input unit can be provided with any desired shape. Apart from a threaded input unit it is also possible to use other cross sectional shapes, such as polygonal shapes, key shaft arrangments and other forms.

To ensure a satisfactory heat transfer, it is advisable to form the heat conducting bridges as webs which are integral with the outer surface of the input unit and are formed of a material having a higher thermal conductivity than the remaining material of the unit. Such a preferred embodiment can be provided, for example, by providing heat conducting bridges which extend out to and form a part of the outer surface of the input unit. Another possibility involves forming the outer surface or jacket of the input unit from the material of higher thermal conductivity with the heat conducting bridges formed as webs extending inwardly from the jacket. When the remaining material of the receiving part is formed of plastic, and the jacket or outer surface has the higher thermal conductivity the jacket can be prefabricated and then sprayed with plastic with the final shaping of the jacket of the input unit being effected even after the spraying has taken place.

To ensure that both torque transmission and heat transfer are satisfactory, it is preferable if the drilling member shank is connected with the webs of the input unit which afford the heat conducting bridges. Such connections can be provided by pressing the webs into recesses formed in the shank or the webs can be fixed to the shank by welding or soldering.

Another connection between the shank and the heat conducting bridges formed as webs can be obtained by fitting a sleeve around the shank with the webs formed integrally with the sleeve. Such a sleeve can be connected to the shank in various ways, for example, by soldering, welding, or upsetting in the form of projections or depressions.

In another embodiment, the heat conducting bridges can be formed as spaced disks laterally surrounding the shank and extending substantially radially outwardly with the disks extending through the other material forming the input unit out to the outer surface of the unit. The production of such an input unit, which has particularly good physical properties, is possible, for example, by using plastic as the other material and spraying it onto and between the disks. Further, it is advisable to provide openings through the disks to ensure an optimum interengagement between the plastic and the disks.

If the input unit is threaded, it is advisable to form the heat conducting bridges as a helical coil with a number of individual turns and with the turns extending radially outwardly from the shank of the drilling member to the outer surface of the input unit. One preferred arrangement for forming such an input unit involves the formation of a thread on the shank of the drilling member with the coil positioned in said thread with the corresponding pitch. If the remaining material of the input unit is plastic, it can be applied by spraying and again it is expedient to provide openings through the individual turns of the coil so that the plastic can interengage the coil within the openings. This embodiment has the particular advantage that the highest stressed part of the input unit, that is, the thread, is also mechanically reinforced.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 4 is still another embodiment of the present invention illustrating in section the rearward end of a drilling tool with the input unit shown in longitudinal section; and FIG. 5 is yet another embodiment of the invention showing the input unit in longitudinal section similar to FIG. 4.

DETAILED DESCRIPTION OF THE INVENTION

Figure 1:
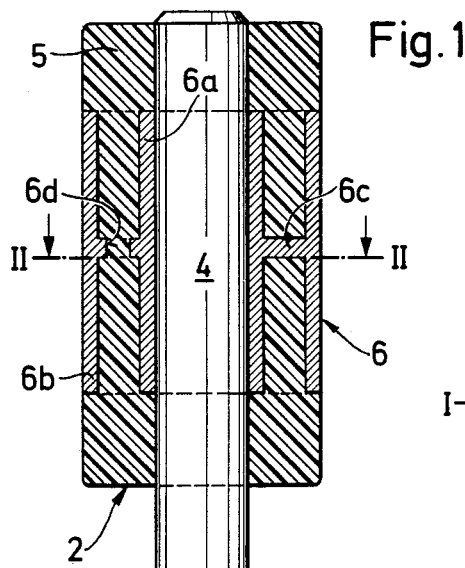
FIG. 1 is an elevational view of a drilling tool consisting of a drilling member and an input unit with the input unit shown in section.
Figure 2:
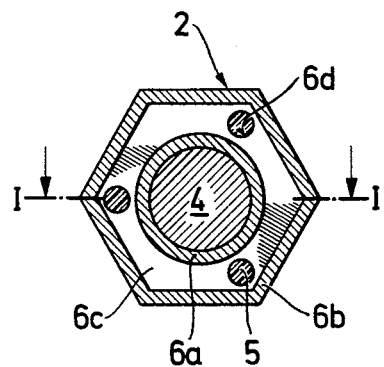
FIG. 2 is a veiw taken along the line II—II.

In FIG. 1 a drilling tool is illustrated consisting of a drilling member 1 and a holder or input unit 2. The drilling member 1 consists of a forward drilling part 3 of a known type, that is, with a helically formed spiral, and a rearward or shank part 4 laterally enclosed by the input unit. As can be seen in FIG. 2, the input unit has a hexagonal outer shape. The input unit is formed of a body 5 and a heat conducting bridge 6. As shown in FIGS. 1 and 2, the heat conducting bridge 6 is made up of an inner sleeve 6i a laterally contacting the shank 4 and an outer sleeve 6b spaced outwardly from the inner sleeve and forming a part of the jacket or outer surface of the input part 2. A flange-type web 6c extends radially between the outer surface of the inner sleeve 6a and the inner surface of the outer sleeve 6b. The web 6c is provided with openings 6d extending in the axial direction of the shank to provide an improved connection between the body 5 and the heat conducting bridge 6.

While the heat conducting bridge 6 illustrated in FIGS. 1 and 2 is shown with a polygonal outer configuration, the outer surface of the input unit is not limited to such a shape and other cross sectional configurations can be used. The attachment of the conducting bridge 6 on the shank 4 of the drilling member can be effected in any desired manner, particularly by form-locking, welding, soldering and other similar means.

In the embodiment of FIGS. 1 and 2 the heat conducting bridge is formed of a material, such as a metal, having a higher thermal conductivity than the material forming the body 5 which is formed of a plastic.

Figure 3:
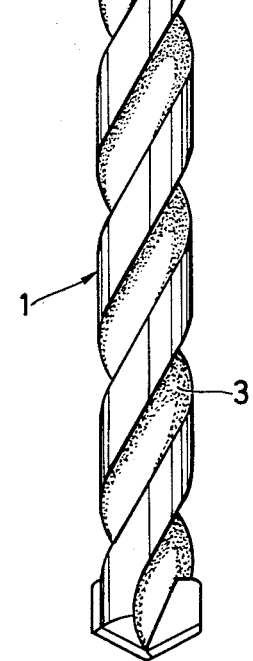
FIG. 3 is a cross sectional view of another embodiment of the invention showing a polygonal input unit.
Figure 3:
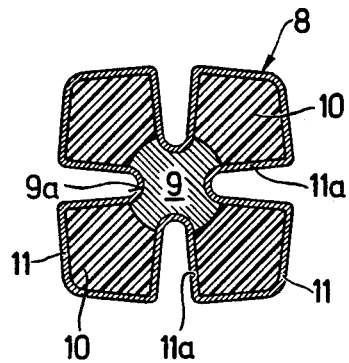

In FIG. 3, another embodiment of an input unit 8 is shown which is provided in form-locked engagement with the shank 9 of a drilling member. The input unit 8 is constructed of a body 10 enclosed within a sleeve 11 with webs 11a formed in the sleeve and extending inwardly from its outer surface to the shank 9. The webs 11a extend into grooves or depressions 9a in the shank so that a form-locked connection is provided between the input unit 8 and the shank 9. In this arrangement the input unit can transmit torque or rotational movement to the shank without any relative movement occurring between the input unit and the shank.

The embodiment illustrated in FIG. 3 is again only exemplary. It is not intended to limit the outer configuration of the input unit to a polygon, rather other shapes can be employed for the outer surface. The production of such an input unit can be effected by spraying plastic into the space between the shank 9 and the sleeve 11 and then stamping or pressing the sleeve inwardly at spaced positions to form the webs 11a.

In FIG. 4, the shank 12 of a drilling member is provided with an input unit 13 with a male thread formed on the outer surface of the unit. Heat conducting bridges are provided in this embodiment by a coil 14 which forms a part of the outer surface of the input unit 13. Such an input unit can be produced by positioning the coil 14 on a thread 15 formed on the shank 12 and then spraying the shank on all sides with plastic. As can be seen in FIG. 4, the plastic is formed both between the individual turns of the coil 14 and also extends forwardly and rearwardly of the coil along the shank. Furthermore, to improve the connection between the material sprayed on the shank, the individual turns of the coil 14 are provided with openings extending in the axial direction of the shank so that the plastic can be sprayed into the openings to provide a positive interengagement between the coil and the plastic.

Another embodiment is shown in FIG. 5 and it consists of a shank 17 of the drilling member with an input unit 18 laterally enclosing the rearward end of the shank. It should be noted in the embodiments shown that the rearward end of the shank extends through and beyond the input unit. The input unit is formed first by fixing spaced disks 19 on the shank 17 and the spraying plastic around the shank so that it is located between the disks and also forwardly and rearwardly of the disks. As with the other embodiments shown, the connection between the material sprayed and the disks 19 is improved by forming axially extending openings 20 through the disks. The disks can be fixed onto the shank 17 in various ways, for example, by welding, soldering, or by form-locking the two parts by correspondingly shaping the interlocking parts.

In these various embodiments the heat conducting bridges are formed of a material having a higher thermal conductivity than the remaining material. In this way, any heat generated within the shank can be transmitted through the heat conducting bridges to the drilling machine holder or chuck into which the drilling tool is fitted. As can be appreciated, the outer shape of the input unit is complementary to the shape of the drilling machine holder into which it is fitted.

What is claimed is:

1. A drilling tool arranged to be inserted into a drilling machine for use in boring holes and the like where rotational movement developed in the drilling machine is transferred to the drilling tool, said drilling tool comprising a drilling member and an input unit, said drilling member comprises an axially elongated shank having a forward end shaped to effect boring action and a rearward end, said input unit being formed at least in part of material having a different and lower thermal conductivity than the material forming said drilling member and laterally enclosing at least an axially extending portion of said rearward end, said input unit having an outer surface spaced radially outwardly from and extending circumferentially about the rearward end of said shank and arranged to fit into and to transmit the rotational movement of the drilling machine to said drilling member, said input unit being formed of at least a first material and a second material with said first material having a higher thermal conductivity than said second material and forming at least part of the outer surface of said input unit, said second material having the different and lower thermal conductivity than the material forming said drilling member, wherein the improvement comprises a heat conducting bridge extending between the outer surface of said input unit and said shank, said heat conducting bridge being formed of said first material, said heat conducting bridge being capable of transmitting heat radially outwardly from said shank of said drilling member and said second material being of a softer material than the material of said drilling member and being in contact with said heat conducting bridge and filling said input unit between the outer surface thereof and said shank so that the combination of said first and second materials affords sufficient strength to said input part to transmit the rotational movement of the drilling machine to said shank.

2. A drilling tool, as set forth in claim 1, wherein said heat conducting bridge has a first surface located on the outer surface of said input unit, and said heat conducting bridge includes a web extending from said first surface inwardly into heat transfer relation with said shank.

3. A drilling tool, as set forth in claim 2, wherein said web is in direct surface contact with said shank.

4. A drilling tool, as set forth in claim 2, wherein said web has at least one opening therethrough, and said second material of said input unit being secured within the opening in said web.

5. A drilling tool, as set forth in claim 2, wherein said first material is a metal and said second material is a plastic.

6. A drilling tool, as set forth in claim 2, wherein said heat conducting bridge comprises a sleeve extending in the axial direction of and in contact with said shank, and said web is formed integrally with and extends outwardly from said sleeve.

7. A drilling tool, as set forth in claim 6, wherein said sleeve is fixed to said shank.

8. A drilling tool, as set forth in claim 2, wherein said heat conducting bridge comprises a plurality of webs and said webs comprise disks spaced apart and extending radially outwardly from said shank.

9. A drilling tool, as set forth in claim 8, wherein the spaces between said disks are filled with said second material.

10. A drilling tool, as set forth in claim 2, wherein said web of said heat conducting bridge comprises a coil extending in the axial direction of said shank and extending radially outwardly from the rearward end of said shank to the outer surface of said input unit.

11. A drilling tool, as set forth in claim 10, wherein said coil is helically shaped and comprises a number of axially spaced individual turns.

12. A drilling tool, as set forth in claim 10, wherein the individual turns of said coil have openings therethrough extending in the axial direction of said shank and said second material is a plastic and is filled into the openings in the individual turns of the coil and between the individual turns of the coil.

13. A drilling tool, as set forth in claim 2, wherein said heat conducting bridge comprises an outer sleeve having its axis generally parallel with the axis of said shank, the radially outer surface of said outer sleeve located in the outer surface of said input unit, an inner sleeve fixed to and extending in the axial direction of said shank, and said web extending radially between and being integral with said inner sleeve and said outer sleeve.

14. A drilling tool, as set forth in claim 13, wherein said outer sleeve is polygonally shaped in section extending transversely of the axis of said shank.

15. A drilling tool, as set forth in claim 13, wherein said web has at least one opening therethrough extending in the axial direction of said shank, and said second material of said input unit being secured within said opening.

16. A drilling tool, as set forth in claim 15, wherein said second material comprises a plastic.

17. A drilling tool, as set forth in claim 16, wherein said second material has an outer surface forming a part of the outer surface of said input unit and said second material filling the space between said outer sleeve and said inner sleeve, said second material also having portions thereof extending axially forwardly of and rearwardly of said heat conducting bridge and being in surface contact with said shank in said forwardly and rearwardly extending portions.

18. A drilling tool, as set forth in claim 2, wherein said heat conducting bridge comprises a sleeve disposed about and spaced outwardly from the rearward end of said shank, and said web comprises a plurality of projections formed inwardly from said sleeve and extending into contact with the rearward end of said shank.

19. A drilling tool, as set forth in claim 18, wherein said sleeve has a polygonal shape in section transverse to the axis of said shank and said sleeve, said projections therefrom and the surface of the shank defining a number of cavities with said cavities filled with said second material.

20. A drilling tool, as set forth in claim 19, wherein the rearward end of said shank has recesses formed therein and said projections from said sleeve extend inwardly into and are secured within said recesses.

* * * * *